US010383349B2

(12) United States Patent
Lin et al.

(10) Patent No.: US 10,383,349 B2
(45) Date of Patent: Aug. 20, 2019

(54) POST-PACKAGING PASTEURIZATION

(71) Applicant: Hill's Pet Nutrition, Inc., Topeka, KS (US)

(72) Inventors: Hungwei Lin, Lawrence, KS (US); Alexander Skutlartz, Topeka, KS (US); Peter Romano, Lawrence, KS (US)

(73) Assignee: Colgate-Palmolive Company, New York, NY (US)

( * ) Notice: Subject to any disclaimer, the term of this patent is extended or adjusted under 35 U.S.C. 154(b) by 256 days.

(21) Appl. No.: 15/033,832

(22) PCT Filed: Nov. 4, 2013

(86) PCT No.: PCT/US2013/068293
§ 371 (c)(1),
(2) Date: May 2, 2016

(87) PCT Pub. No.: WO2015/065489
PCT Pub. Date: May 7, 2015

(65) Prior Publication Data
US 2016/0270432 A1  Sep. 22, 2016

(51) Int. Cl.
*A23L 3/02* (2006.01)
*A23L 3/10* (2006.01)
*B65B 55/10* (2006.01)

(52) U.S. Cl.
CPC ............... *A23L 3/10* (2013.01); *A23L 3/02* (2013.01); *B65B 55/10* (2013.01); *A23V 2002/00* (2013.01)

(58) Field of Classification Search
CPC ..... A23L 3/10; A23L 3/02; A23L 3/04; A23L 3/06; B65B 55/10; A23V 2002/00
See application file for complete search history.

(56) References Cited

U.S. PATENT DOCUMENTS

| | | | |
|---|---|---|---|
| 1,987,414 A * | 1/1935 | Omsted | A23L 3/045 99/362 |
| 2,760,873 A * | 8/1956 | Munz | A23L 3/001 422/26 |
| 2,995,418 A * | 8/1961 | Muller | A23C 3/023 422/38 |
| 3,252,405 A * | 5/1966 | Mencacci | A23L 3/045 426/521 |
| 3,407,721 A * | 10/1968 | Carvallo | A23L 3/045 99/362 |
| 3,592,664 A * | 7/1971 | Verlin | A23B 7/085 426/407 |
| 3,814,889 A * | 6/1974 | Stenstrom | A23L 3/01 219/700 |
| 3,966,980 A | 6/1976 | McGuckian et al. | |
| 3,997,677 A | 12/1976 | Hirsch et al. | |
| 4,058,364 A * | 11/1977 | Terumoto | A23L 3/04 422/297 |
| 4,191,787 A | 3/1980 | Baurmann et al. | |
| 4,346,650 A * | 8/1982 | Zaitsu | A23L 3/10 99/361 |
| 4,441,406 A * | 4/1984 | Becker | A23L 3/003 422/25 |
| 4,490,401 A * | 12/1984 | Becker | A23L 3/003 426/407 |
| 4,495,208 A | 1/1985 | Friedman et al. | |
| 4,693,902 A | 9/1987 | Richmond et al. | |
| 5,266,343 A | 11/1993 | Stauffer et al. | |
| 5,280,748 A | 1/1994 | Pardo et al. | |
| 5,283,033 A * | 2/1994 | Dodrill | A23L 3/10 422/21 |
| 5,440,104 A | 8/1995 | Koch et al. | |
| 6,010,727 A | 1/2000 | Rosenthal et al. | |
| 7,285,299 B1 | 10/2007 | Howard et al. | |
| 2002/0073652 A1* | 6/2002 | Wiedemann | A23L 3/02 53/425 |
| 2004/0156960 A1 | 8/2004 | Villota et al. | |
| 2006/0034980 A1 | 2/2006 | Perdue et al. | |
| 2006/0286226 A1 | 12/2006 | Hong et al. | |
| 2009/0196959 A1* | 8/2009 | Guzman | A23B 7/0056 426/106 |
| 2009/0297672 A1* | 12/2009 | Warne | A23B 4/0056 426/106 |

(Continued)

FOREIGN PATENT DOCUMENTS

| | | |
|---|---|---|
| DE | 1217761 | 5/1966 |
| EP | 2145543 | 1/2010 |
| GB | 1025959 | 4/1966 |

(Continued)

OTHER PUBLICATIONS

Lin, Brittany "19 Foods That Will Quench Your Thirst" Aug. 3, 2011 https://www.rodalesorganiclife.com/food/water-foods.* "pH Values of Common Foods and Ingredients" Dec. 24, 2012.*
"FDA—Approximate pH of Foods and Food Products" Apr. 26, 2012 http://web.archive.org/web/20120426153421/http://www.webpal.org/SAFE/aaarecovery/2_food_storage/Processing/lacf-phs.htm.*
"Guidance for Industry: Juice HACCP Hazards and Controls Guidance" First Edition, Mar. 3, 2004 https://www.fda.gov/Food/GuidanceRegulation/GuidanceDocumentsRegulatoryInformation/Juice/ucm072557.htm.*
"FAO—Fruit and Vegetable Processing." Mar. 10, 2012 http://web.archive.org/web/20120310114021/http://www.fao.org/docrep/V5030E/V5030E0e.htm.*

(Continued)

*Primary Examiner* — Viren A Thakur

(57) ABSTRACT

A method of pasteurizing food in a sealed container is provided, the method comprising (i) submerging the container in a first water bath, and (ii) heating for a time and at a temperature effective to kill, inactivate or reduce bacteria to safe levels, wherein the first water bath provides a pressure in excess of atmospheric pressure, so that the increase in internal pressure in the container upon heating is offset by the external pressure of the water, then (iii) cooling the container. Further provided are systems for carrying out said method, and food products pasteurized thereby.

12 Claims, No Drawings

(56) References Cited

U.S. PATENT DOCUMENTS

2011/0123690 A1* 5/2011 Zavadtsev Koulik .... A23L 2/48
426/234

FOREIGN PATENT DOCUMENTS

| WO | WO2008/091185 | 7/2008 |
| WO | WO2010/026897 | 3/2010 |

OTHER PUBLICATIONS

"Food Processing Technologies" Mar. 20, 2018 http://web.archive.org/web/20130320120117/http://www.foodtechinfo.com:80/FoodPro/FoodPro.htm (Year: 2013).*

International Search Report and Written Opinion of the International Searching Authority in International Application No. PCT/US2013/068293, dated Jul. 16, 2014.

* cited by examiner

POST-PACKAGING PASTEURIZATION

BACKGROUND

Pasteurization of foods is a thermal process to achieve a partial sterilization with significant (e.g. 5-log) reduction of food spoilage organisms and pathogens like *Clostridium botulinum, Salmonella* spp., *E. coli, Usteria* spp., *Campylobacter* spp., *Staphylococcus* spp., etc. The microorganism of greatest concern is *Clostridium botulinum*, a gas forming anaerobe that produces a lethal exotoxin, but other spoilage organisms present need to be inactivated. The thermal process is designed to destroy or inactivate these organisms. Certain bacteria may survive the process, but their levels are greatly reduced, so that the product is rendered safe, although not necessarily sterile. The pasteurization process needs to be carried out in a way which is controlled and highly consistent and which does not damage or destroy either the container or the food.

Pasteurization process has been broadly utilized in many food productions for ready to eat products such like refrigerated cooked meat products, infant formula, Jello, tomato sauces, juices, etc. Usually, pasteurization is carried out before packaging and prior to sealing into structurally strong, heat-resistant containers like bags, bottles, jars, cartons, or cans. By refrigeration, low moisture content, or low pH in conjunction with either hot filling or aseptic packaging, those packaged foods can achieve food safety requirement along with a reasonable shelf life. Post packaging pasteurization has also been utilized for processing shelf stable low pH and high moisture food without either hot filling or aseptic packaging; however, those products are usually packaged in rigid containers like metal cans or glass jars in order to withstand pressure expansion during the process.

Plastic food containers are popular, as they can be recycled, they require less energy to manufacture than metal containers, they are suitable for use in a microwave, and they allow for see-through packaging and/or packaging with customized shapes, coloring and labeling. Plastic containers may be less heat- or pressure-resistant than glass or metal containers; especially, pasteurization of food in a sealed plastic container presents particular challenges, because pressure expansion upon heating can easily distort or rupture the package. Thus where plastic containers are used, the food is usually pasteurized by heating, followed by hot filling or aseptic packaging of the plastic cup, tray or flexible pouch. Flexible vacuum-sealed pouches may in some cases be pasteurized post-filling, as they typically do not contain any significant headspace, so the only expansion is the expansion of the food, and they are flexible and relatively elastic, and so can tolerate some expansion of the food. Alternatively, clear plastic containers can be cold pasteurized with UV light. There is however still a significant need for a commercially practical system for pasteurizing food packaged inside a rigid or semi-rigid container, e.g. a plastic tray.

SUMMARY

In one aspect, the invention provides a novel process for post-packaging pasteurization of food in plastic containers, for example, a method of pasteurizing food in a sealed container, e.g. a plastic container, comprising (i) submerging the container in a first water bath, then (ii) heating for a time and at a temperature effective to kill, inactivate or reduce bacteria to safe levels, wherein the first water bath is under pressure, so that the increase in internal pressure in the container upon heating is offset by the external pressure of the water, then (iii) cooling the container. In another aspect, the invention provides a system for carrying out such a process. In another aspect, the invention provides food products pasteurized using such a process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The invention provides, in a first embodiment, a method (Method 1) of pasteurizing food in a sealed container, e.g. a rigid or semi-rigid plastic container, comprising (i) submerging the container in a first water bath, then (ii) heating for a time and at a temperature effective to kill, inactivate or reduce bacteria to safe levels, wherein the first water bath provides pressure in excess of atmospheric pressure, so that the increase in internal pressure in the container upon heating is offset by the external pressure of the water, then (iii) cooling the container; for example, 1.1. Method 1 wherein the food comprises greater than 50% water, e.g., 56-99% water.
1.2. Method 1 or 1.1 wherein the pressure of the water bath is calculated in accordance with the ideal gas law (i.e., $PV=nRT$), e.g, wherein the pressure of the first water bath is calculated using the ideal gas law to be approximately the pressure necessary to keep the volume of an empty container constant when the container is heated to the highest internal temperature which the food will reach in the process, e.g., wherein the pressure of the first water bath is greater than 1 atm, e.g., 1.1-1.5 atm, e.g., about 1.2 atm.
1.3. Any preceding method wherein the temperature of the first water bath during heating is 83-99° C., e.g., 90-99° C., e.g. about 95° C.
1.4. Any preceding method wherein the food is heated for a time and at a temperature sufficient to reach an internal temperature of 72-95° C., e.g., at least 82.2° C., e.g., 82.2-90° C.
1.5. Any preceding method wherein the period of heating is at least 20 minutes, e.g., 30-40 minutes, e.g., about 35 minutes.
1.6. Any preceding method wherein the target internal temperature is maintained for 1-10 minutes, e.g., at least 90 seconds, e.g., 90-150 seconds.

1.7. Any preceding method wherein the pH of the food is less than 4.6 and the heating is sufficient to maintain an internal temperature of at least 63° C. for at least 30 minutes.
1.8. Any preceding method wherein the wherein the pH of the food is less than 4.6 and the heating is sufficient to maintain an internal temperature of at least 73.9° C. for at least 15 seconds.
1.9. Any preceding method wherein the food is packaged at ambient temperature of 15-30° C. about 25° C.
1.10. Any preceding method wherein the food is heated for a tune and at a temperature sufficient to achieve at least a 5-log reduction of food pathogens.
1.11. Any preceding method wherein the container is cooled in a second water bath, e.g., wherein the temperature of the second water bath is 20-40°C., e.g. 25-35° C., e.g., about 30° C.; e.g., for a time sufficient to reduce the internal temperature of the food to approximately the temperature of the second water bath, e.g. for 10-30 minutes, e.g., about 20 minutes.
1.12 . Any preceding method wherein the container is inspected following cooling to check for rupture, leakage or other damage to the container.
1.13. Any preceding method wherein the container is moved into, through and out of the first water bath, and optionally into, through, and out of a second water bath using a mechanical conveyer.
1.14. Any preceding method wherein the water in first water bath is heated by circulation through a heating heat exchanger, which returns heated water to the first water bath at a first pressure, wherein the first water bath is in fluid connection with a second water bath, which is cooled by circulation through a cooling heat exchanger, which returns cooled water to the second water bath at a second pressure, wherein the first pressure is greater than the second pressure.

The specific temperatures and pressures in the above processes may be adjusted based on the size of the containers (smatter volume containers will in general reach target internal temperatures more quickly), the of the contents (acidic foods, e.g., less than 4.6, are less susceptible to spoilage), the water content and volumetric thermal expansion coefficient of the contents, headspace in the container, initial microbial content of food, and so forth, so long as the primary objective of rendering the food safe for consumption following storage is met.

In a further embodiment, the invention provides a pasteurization system (System 1) for carrying out pasteurization of food in a sealed container, e.g, in accordance with any of Methods 1, et seq., comprising a first water bath wherein the water in first water bath is heated by circulation through a heating heat exchanger, which returns heated water to the first water bath at a first pressure, and a second water bath in fluid connection with the first water bath, wherein the water in the second water bath is cooled by circulation through a cooling heat exchanger, which returns cooled water to the second water bath at a second pressure, wherein the first pressure is greater than the second pressure (e.g. at a pressure differential sufficient to substantially prevent backflow of cooled water into first water bath), and wherein at least the first water bath is maintained under elevated pressure sufficient to prevent significant expansion, rupture or deformation of a sealed container when the sealed container is heated in the first water bath. For example, the invention provides, 1.1. System 1 further comprising a mechanical conveyer, e.g, a conveyer belt, to convey the sealed container into and through the first water bath then through and out of the second water bath.
1.2. System 1 or 1.1 wherein the first water baths and the second water bath are partially separated by a partition.
1.3. Any preceding system wherein the first water bath and the second water bath are partially separated by a vertical partition with a fluid connection between the first water bath and the second water bath at the base of the partition, such that the sealed container can be conveyed through the first water bath, under the partition, and through the second water bath.
1.4 Any preceding system wherein the first and second water baths are sufficiently deep to permit total immersion of the sealed container, e.g., under pressure sufficient to prevent significant expansion, rupture or deformation of the sealed container when and after the seated container is heated in the first water bath.
1.5. Any preceding system wherein both the first water bath and the second water bath provide elevated pressure to the sealed container sufficient to prevent sufficient to prevent significant expansion, rupture or deformation of the sealed container.

In a further embodiment, the invention provides food products comprising food in a sealed container, which has been pasteurized in accordance with any of Methods 1, et seq.

EXAMPLE 1

Pasteurization Process

A pasteurization system is set up, comprising a pressurized heating water bath and a cooling water bath contained inside a vessel without pressurization. The temperatures of the heating and cooling water bathes are controlled at 93° C. and 30° C., respectively. Conveyors are used to direct the product movement and control product residence time of 35 minutes in the heating zone and 20 minutes in the cooling zone. As the plastic containers travel downward through the hot water bath, the food temperature increases and reaches a target pasteurization temperature of 82.2° C. internal temperature toward the bottom of the conveyor. Conveyor speed is adjusted such that that target internal product temperature is maintained within the food package for a minimum duration of 90 seconds. In order to overcome the possible expansion of headspace inside the plastic tray during heating, resulting in an internal overpressure, a minimum of 206 cm of water column is maintained by the current design, using the hydraulic pressure to prevent expansion, without causing the distortion of the plastic tray. The water column of the cool water bath is designed to satisfy the minimum water column requirement of 206 cm, as product can reach the peak temperature (85° C.) during heating. The difference in water column height between hot and cool water bath is at least 10 cm in order to maintain a positive water flow from the hot water bath to the cool water bath and to prevent the unintended cooling by the back flow of cool water. As the products travel upward in the cooling water bath, the food temperature is gradually decreasing and headspace pressure inside the plastic tray returns to the ambient level.

The estimation of the required water column (206 cm) for overcoming the headspace expansion during heating is based on the scenario of possible expansion of an empty but sealed plastic container under the highest temperature (85°

C.) that food product inside the tray will encounter during the proposed process, according to following calculations:

i. The ideal gas law is used for current calculation. An ambient environment under conditions of 25° C. of temperature and 1 atm pressure is assumed for current calculation.

$$PV = nRT \quad \text{(Equation 1)}$$

$$1 \text{ atm} \cdot V_{25°\,C.} = nR \cdot 298° \text{ K} \quad \text{(Equation 2)}$$

ii. Under the scenario of the highest internal product temperature (85° C.) reached during the process, the pressure and volume inside the plastic tray are estimated by Equation 3.

$$P_{85°\,C.} \cdot V_{85°\,C.} = nR \cdot 358° \text{ K} \quad \text{(Equation 3)}$$

iii. The relation of change in pressures and volumes of ideal gas at 25° C. and 85° C. can be expressed as Equation 4.

$$\frac{1 \text{ atm} \cdot V_{25°\,C.}}{298° \text{ K}} = \frac{P_{85°\,C.} \cdot V_{85°\,C.}}{358° \text{ K}} \quad \text{(Equation 4)}$$

iv. In order to restrain the volume expansion, the volumes plastic tray under the two o different temperatures should be equal.

$$V_{25°\,C.} = V_{85°\,C.}$$

The pressure inside the plastic tray under 85° C. can be estimated by Equation 5.

$$P_{85°\,C.} = \frac{358° \text{ K}}{298° \text{ K}} \cdot 1 \text{ atm} = 1.2 \text{ atm} \quad \text{(Equation 5)}$$

or 1,240 cm water column iv. According to Equation 6, the anticipated pressure increase inside the plastic tray at 85° C. is estimated by the pressure difference between 85° C. and 25° C. as 0.2 atm or 206 cm of water column, which is also the required hydrostatic pressure for overcoming the possible expansion of the plastic tray.

$$P_{85°\,C.} - P_{25°\,C.} = 1.20 \text{ atm (or 1,240 cm water column)} - 1 \text{ atm (or 1,034 cm water column)} = 0.2 \text{ atm (or 206 cm water column)} \quad \text{(Equation 6)}$$

The specifications for an exemplary process are as follows:

TABLE 1

The specifications of system for past packaging pasteurization of plastic container

| | |
|---|---|
| Capacity of plastic container (oz) | 10.7 |
| Diameter of plastic container (in) | 4.57 |
| Height of plastic container (in) | 1.56 |
| Processing capacity (lbs/hr) | 8,800 |
| Processing capacity (kg/hr) | 4,000 |
| Estimated apparent specific heat capacity | 0.95 |
| Minimum equilibrated pH of food | 4.4 |
| Initial food temperature (° C.) | 25 |
| Target food Temperature (° C.) during heating | 82.2 |
| Temperature of hot water bath (° C.) | 93 |
| Target food temperature (° C.) after cooling | 34 |
| Temperature of cool water bath (° C.) | 30 |
| Estimated energy contingency (%) for heating | 35 |
| Estimated energy contingency (%) for cooling | 10 |

TABLE 1-continued

The specifications of system for past packaging pasteurization of plastic container

| | |
|---|---|
| Kcal required for heating | 308,880 |
| Watts per hr per Kcal conversion | 1.163 |
| KW/hr required for heating | 359 |
| Kcal required for cooling | 212,080 |
| KW/hr required for cooling | 182 |
| Est. heating time (min) | 35 |
| Est. cooling time (min) | 20 |
| Est. water column for heating tower (cm) | 216 |
| Est. water column for cooling tower (cm) | 206 |

This process permits efficient and continuous pasteurization of large quantities of plastic containers in less than one hour of processing time, including heating and cooling, depending on product composition and amount of product inside the plastic container. The cost, equipment construction, heating, and hydrostatic pressure are all reduced relative to a conventional retorting process.

We claim:

1. A method of pasteurizing food in a sealed container, comprising:
submerging the sealed container in a first water bath, the first water bath having a first water column fluidly coupled therewith;
heating for a time and at a temperature effective to kill, inactivate or reduce bacteria to safe levels;
cooling the sealed container in a second water bath in fluid connection with the first water bath, the second water bath having a second water column fluidly coupled therewith; and
maintaining a positive water flow from the first water bath to the second water bath, wherein maintaining the positive water flow comprises maintaining the first water column at a height of at least 10 cm above a height of the second water column,
wherein the first water bath and the first water column provide a pressure in excess of atmospheric pressure, such that the increase in the internal pressure of the sealed container upon heating is offset by the external pressure of the water,
wherein the water in first water bath is heated by circulation through a heating heat exchanger, which returns heated water to the first water bath at a first pressure,
wherein the first water bath and the second water bath are partially separated by a vertical partition with a fluid connection between the first water bath and the second water bath at the base of the partition, such that the sealed container can be conveyed through the first water bath, under the partition, and through the second water bath, which is cooled by circulation through a cooling heat exchanger, which returns cooled water to the second water bath at a second pressure, and
wherein the first pressure is greater than the second pressure.

2. The method of claim 1, wherein the sealed container is a rigid or semi-rigid plastic container.

3. The method of claim 1, wherein the food comprises greater than 50% water.

4. The method of claim 1, wherein the pressure of the first water bath is calculated using the ideal gas law to be approximately the pressure necessary to keep the volume of an empty container constant when the container is heated to the highest internal temperature which the food will reach in the process.

5. The method of claim 1, wherein the temperature of the first water bath during heating is 83-99° C.

6. The method of claim 1, wherein the food is heated for a time and at a temperature sufficient to reach an internal temperature of at least 82.2° C.

7. The method of claim 1, wherein the pH of the food is less than 4.6 and the heating is sufficient to maintain an internal temperature of at least 63° C. for at least 30 minutes or at least 73.9° C. for at least 15 seconds.

8. The method of claim 1, wherein a target internal temperature is maintained for at least 90 seconds.

9. The method of claim 1, wherein the food is heated for a time and at a temperature sufficient to achieve at least a 5-log reduction of food pathogens.

10. The method of claim 1, wherein the sealed container is inspected following cooling to check for rupture, leakage or other damage to the sealed container.

11. The method of claim 1, wherein the sealed container is moved into, through and out of the first water bath using a mechanical conveyer.

12. The method of claim 1, wherein the first pressure is greater than $1 \times 10^5$ Pa.

* * * * *